US009547575B2

(12) United States Patent
Corddry et al.

(10) Patent No.: US 9,547,575 B2
(45) Date of Patent: Jan. 17, 2017

(54) MANAGING HOST COMPUTING DEVICES

(75) Inventors: Matthew T. Corddry, Seattle, WA (US); Wyatt D. Camp, Seattle, WA (US); Jacob Gabrielson, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 663 days.

(21) Appl. No.: 13/221,609

(22) Filed: Aug. 30, 2011

(65) Prior Publication Data
US 2013/0054788 A1 Feb. 28, 2013

(51) Int. Cl.
G06F 15/173 (2006.01)
G06F 11/32 (2006.01)
H04L 12/26 (2006.01)
H04L 12/24 (2006.01)

(52) U.S. Cl.
CPC ......... *G06F 11/326* (2013.01); *H04L 41/0893* (2013.01); *H04L 43/0817* (2013.01)

(58) Field of Classification Search
CPC ........................... H01R 12/16; H04L 43/0817
USPC .................................................. 709/223–226
See application file for complete search history.

(56) References Cited

U.S. PATENT DOCUMENTS

| 7,289,334 | B2 * | 10/2007 | Behrens et al. | 361/788 |
|---|---|---|---|---|
| 7,542,285 | B2 * | 6/2009 | Colucci et al. | 361/688 |
| 7,552,438 | B1 * | 6/2009 | Werme et al. | 718/104 |
| 7,865,688 | B2 * | 1/2011 | Fujibayashi | 711/170 |
| 2003/0037177 | A1 * | 2/2003 | Sutton et al. | 709/316 |
| 2003/0046339 | A1 * | 3/2003 | Ip | 709/203 |
| 2003/0101261 | A1 | 5/2003 | Ikeda et al. | |
| 2003/0229804 | A1 | 12/2003 | Srivastava et al. | |
| 2004/0170016 | A1 | 9/2004 | Pellegrino | |
| 2005/0160314 | A1 | 7/2005 | Ahrens, Jr. et al. | |
| 2007/0090964 | A1 | 4/2007 | You et al. | |
| 2008/0071403 | A1 * | 3/2008 | Conway et al. | 700/97 |
| 2008/0134213 | A1 | 6/2008 | Alverson et al. | |
| 2008/0253085 | A1 * | 10/2008 | Soffer | 361/687 |
| 2008/0294778 | A1 * | 11/2008 | Wang et al. | 709/226 |
| 2008/0317021 | A1 * | 12/2008 | Ives et al. | 370/389 |
| 2009/0070697 | A1 * | 3/2009 | LaForest | 715/772 |

(Continued)

FOREIGN PATENT DOCUMENTS

| CN | 1922578 A | 2/2007 |
|---|---|---|
| CN | 101246390 A | 8/2008 |

(Continued)

OTHER PUBLICATIONS

APC—InfraStruXure Manager, 2004, all pages.*
International Search Report and Written Opinion dated October 31, 2012, International Application No. PCT/US2012/052356.

*Primary Examiner* — Hieu Hoang
(74) *Attorney, Agent, or Firm* — Knobbe, Martens, Olson & Bear, LLP

(57) ABSTRACT

Systems and methods are disclosed which facilitate the management of host computing devices through the utilization of a host computing device control component. The host computing device control component includes a state monitoring component that monitors operating states of the control component. Based on monitoring the operating of the control component, the state monitoring component causes the generation of one or more visual indicator indicative of the operating state of the control component.

30 Claims, 4 Drawing Sheets

(56) References Cited

U.S. PATENT DOCUMENTS

| | | | |
|---|---|---|---|
| 2009/0144420 A1* | 6/2009 | Attanasio et al. | 709/224 |
| 2011/0084839 A1 | 4/2011 | Groth et al. | |
| 2012/0030194 A1* | 2/2012 | Jain | 707/722 |
| 2012/0072745 A1* | 3/2012 | Ahluwalia et al. | 713/320 |

FOREIGN PATENT DOCUMENTS

| | | |
|---|---|---|
| CN | 101401498 A | 4/2009 |
| CN | 101854270 A | 10/2010 |
| JP | 2004-259044 A | 9/2004 |
| JP | 2009-238066 A | 10/2009 |
| JP | 2011-008481 A | 1/2011 |
| RU | 2327105 A1 | 6/2008 |

\* cited by examiner

MANAGING HOST COMPUTING DEVICES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. Each single physical computing device can be generally referred to as a host computing device. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In conjunction with the utilization of virtualization technologies, data centers can physically organize sets of host computing devices to allow the host computing devices to share computing device resources, such as power or communication network connectivity. Such physical organization can correspond to physical racks in which the hosting computing devices are mounted, generally referred to as racks of host computing devices. As the number of racks of host computing devices increases, service providers associated with data centers have difficulty distinguishing between errors or faults associated with individual host computing devices, shared resources associated with a particular rack or distributed components utilized to manage the host computing devices.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the management of host computing devices. Specifically, systems and methods are disclosed which facilitate the management of host computing devices through the utilization of a host computing device control component, or control component. Illustratively, a set of host computing devices are organized into a physical rack. Additionally, one host computing device control component is associated with each physical rack. In one aspect, the control component is in communication with the host computing device to monitor performance or manage the operation of various aspects of the host computing devices in the corresponding rack. In another aspect, the control component includes a separate state monitoring component that monitors operating states of the control component. Illustratively, the state monitoring component includes a power supply separate from the control component power supply, a state processing component and a visual indicator interface. Based on monitoring the operating of the control component, the state monitoring component causes the generation of one or more visual indicator indicative of the operating state of the control component.

Figure 1:
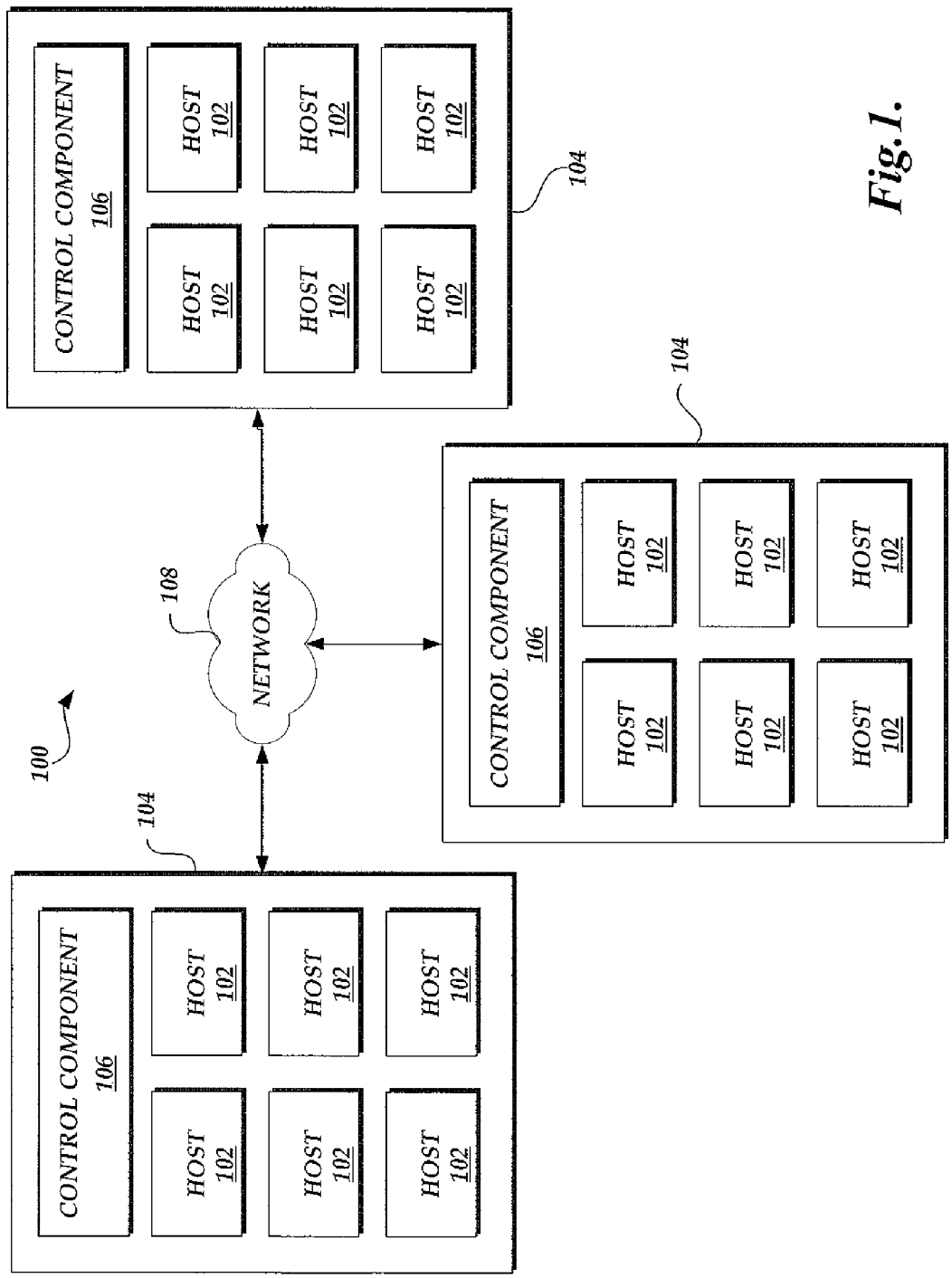
FIG. 1 is a block diagram depicting an illustrative environment for managing host computing devices including a number of host computing devices and control components.

With reference now to FIG. 1, a block diagram depicting an illustrative host computing device environment 100 for managing host computing devices will be described. The host computing device environment 100 includes a plurality of host computing devices 102. Illustratively, the host computing devices 102 correspond to server computing device having one or more processors, memory, operating system and software applications that can be configured for a variety of purposes. Additionally, the host computing devices 102 may be configure to host one or more virtual machine instances. As illustrated in FIG. 1, the plurality of host computing devices 102 are organized according to a physical placement of a set of host computing devices, such as a rack or other support structure. The organization of each set of host computing devices 102 will be generally referred to as a rack 104. In alternative embodiments, the host computing devices 102 may be organized in accordance with other organizational criteria, including physical and logical criteria.

In an illustrative embodiment, each rack 104 is associated with a host computing device control component 106, which can also be referred to as a rack control component. In an illustrative embodiment, a host computing device control component 106 can manage the operation of the set of host computing devices 102, or components thereof, including, but not limited to provisioning, updating, monitoring, and modifying software associated with the host computing devices. The host computing device control component 106 also includes a state monitoring component for monitoring the state of the operation of the host computing device control component 106 and providing visual indicators corresponding to the determined state of operation. Illustrative components of the host computing device control component 106 will be described with regard to FIG. 2.

As illustrated in FIG. 1, the multiple racks 104 of host computing devices 102 may communicate via a communication network 108, such as a private or public network. For example, host computing device control components 106 from each rack 104 may be able to communicate with each other via the communication network 108, which can include a private communication network specific to host computing device control components. One skilled in the relevant art will appreciate that each rack 104 may include any number of host computing devices 102 and that the host computing device environment 100 can include any number of racks 104. Still further, the racks 104 may be further organized in a manner that does not require connectivity between all the racks in the host computing device environment.

Figure 2:
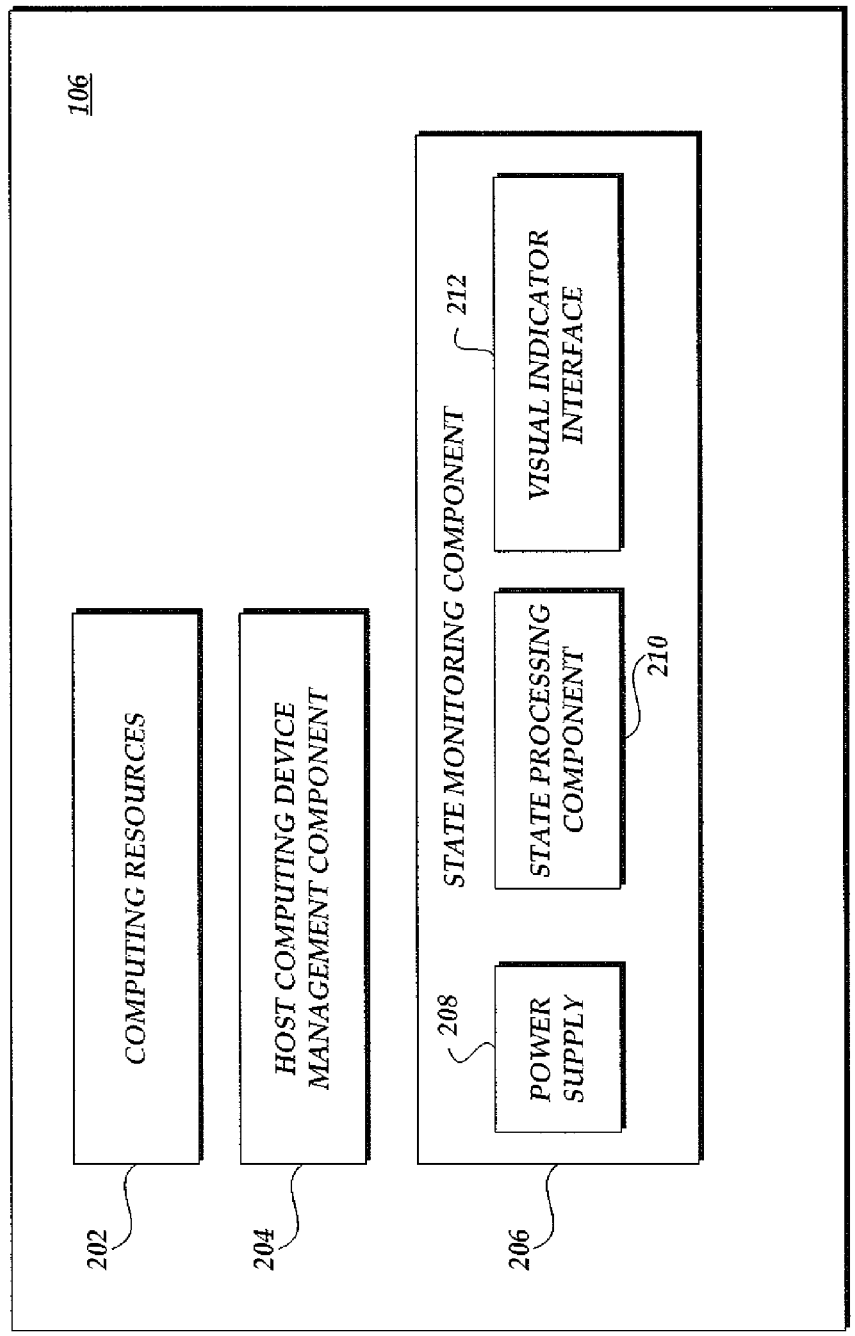
FIG. 2 is a block diagram illustrative of components of a control component for utilization in the environment for managing host computing devices of FIG. 1.

Turning now to FIG. 2, illustrative components of a host computing device control component 106 in the host computing device environment 100 will be described. In an illustrative embodiment, the host computing device control component 106 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. The content delivery environment 100 can include any of number and various kinds of host computing device control components 106, which may be customized according to specific racks 104 or types of racks.

Illustratively, the client computing devices 102 may have varied local computing resources such as central processing units and architectures, memory, mass storage, graphics processing units, communication network availability and bandwidth, etc. Generally, however, each host computing device control component 106 may include various computing resources 202 that can include one or more processing units, such as one or more CPUs. The computing resources 202 may also include system memory, which may correspond to any combination of volatile and/or non-volatile storage mechanisms. The system memory may store information that provides an operating system component, various program modules, program data, or other components. The host computing device control component 106 performs functions by using the processing unit(s) to execute instructions provided by the system memory. The computing resources 202 may also include one or more input devices (keyboard, mouse device, specialized selection keys, touch screen interface, stylus, etc.) and one or more output devices (displays, printers, audio output mechanisms, etc.). The computing resources 202 may also include one or more types of removable storage and one or more types of non-removable storage. Still further, the computing resources can include hardware and software components for establishing communications over the communication network 108, such as a wide area network or local area network, or via an internal communication network connecting the set of host computing devices 102. For example, the host computing device control component 106 may be equipped with networking equipment and software applications that facilitate communications via the Internet or an intranet.

However, although various computing resources 202 have been identified, ones skilled in the relevant art will appreciate that various combinations of computing resources may be implemented on a host computing device control component 106 and that one or more of the identified computing resources may be optional.

As illustrated in FIG. 2, the host computing device control component 106 can include, among other hardware or software components, a management component 204 for facilitating management of the set of host computing devices 102. As discussed above, the management component 204 can facilitate various interactions with one or more of the set of host computing devices 102 including, but not limited to, provisioning, updating, monitoring, and modifying software associated with the host computing devices. Although the management component 204 is illustrated as a single component, one skilled in the relevant art will appreciate that the management component 204 may be made up of a number of components or subcomponents to carry out one or more management functions associated with the host computing device control component 106.

The host computing device control component 106 can also include a state monitoring component 204 for monitoring the state of the operation of the host computing device control component 106 and providing visual indicators corresponding to the determined state of operation. The state monitoring component 204 can include various components, or subcomponents for monitoring or processing the state of operation of the state monitoring component for monitoring the state of the operation of the host computing device control component 106 and providing visual indicators corresponding to the determined state of operation of the host computing device control component 106. In one aspect, the state monitoring component 204 includes a power supply 208 for providing power to one or more components of the state monitoring component 204. Illustratively, the power supply 208 is independent of any power supply associated with the host computing device control component 106 such that a loss of power by the host computing device control component 106 does not result in a loss of power to the state monitoring component 204. For example, the power supply 208 may correspond to a battery or other capacitive device. The state monitoring component 204 can also include a state processing component 210 for determining an operating state of the rack control component based on one or more inputs provided to the state monitoring component 204 or based on a failure to receive inputs. The state monitoring component 204 can also include visual indicator interface component 212 for causing the generation of visual indicators, or other indicators, based on various determined operating states of the host computing device control component 106. In one embodiment, the visual indicator interface component 212 can include or be in direct communication with hardware for making the visual indications, including, but not limited to, liquid crystal displays ("LCD"), light emitting diodes ("LED"), sets of LCDs, sets of LEDs, multi-color LEDS, sets of multi-color LEDS and various combinations thereof. In another embodiment, the hardware for making the visual indications may be part of the computing resources 202 such that the visual indicator interface 212 is in communication (directly or indirectly) to cause the generation of various visual indicators as will be described below.

Figure 3:
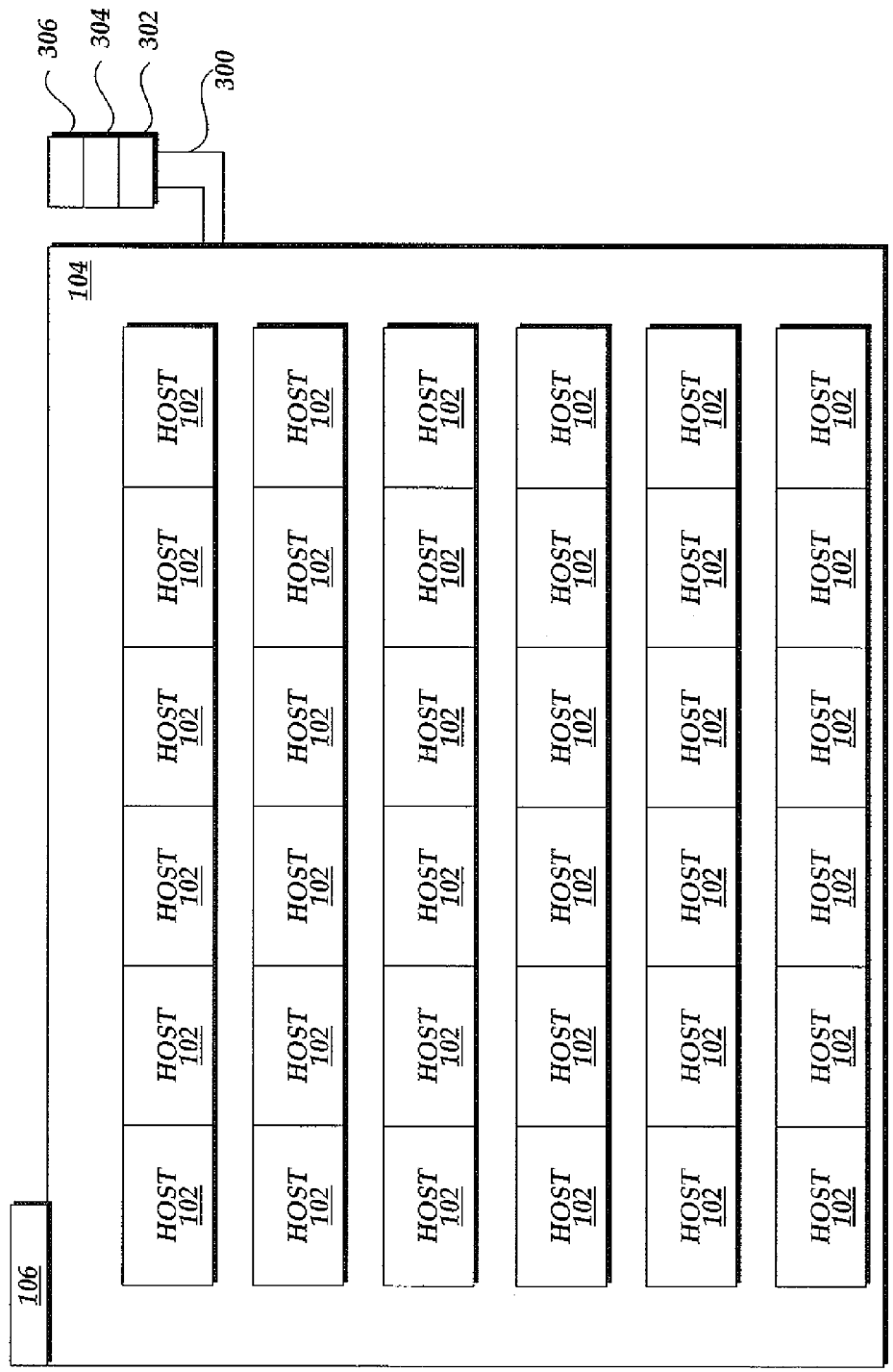
FIG. 3 is a block diagram illustrative of components of a physical rack of host computing devices, a control component, and a visual indicator associated with the control component.

With reference now to FIG. 3, in one embodiment, each rack 104 may include rows of host computing devices 102. As previously described, the rack 104 may provide some resources shared by the host computing devices 102, such as power, network connectivity, and the like. Additionally, one or more of the host computing devices 102 may function, at least in part, to provide functionality utilized by the other host computing devices 102 in the rack 104, such as network routing, firewall, etc. Additionally, the rack 104 includes a host computing device control component 106 for managing the operation of the host computing devices 102. In one embodiment, the host computing device control component 106 can include one or more embedded hardware components for generating the visual indications in accordance with control instructions provided by the visual indicator interface 212. In another embodiment, as illustrated in FIG. 3, the rack 104 can include external hardware components 300 for generating one or more of the visual identifications associated with the operating state of the host computing device control component 106. The hardware components 300 can include a single component for generating sets of visual indications. Alternatively, the hardware components 300 can include multiple visual indication hardware components 302, 304, 306 in which each hardware component can correspond to a different visual indication or operating state. For example, on hardware component may be used to visualize a determined non-fault state while a separate hardware component may be used to visualize a determined fault state. In another example, a separate hardware component may be utilized to visualize a power off state of the host computing device control component 106. One skilled in the relevant art will appreciate that alternative locations for the hardware components 300 or different arrangement of hardware components 300 may be associated with one or more racks 104.

Figure 4:
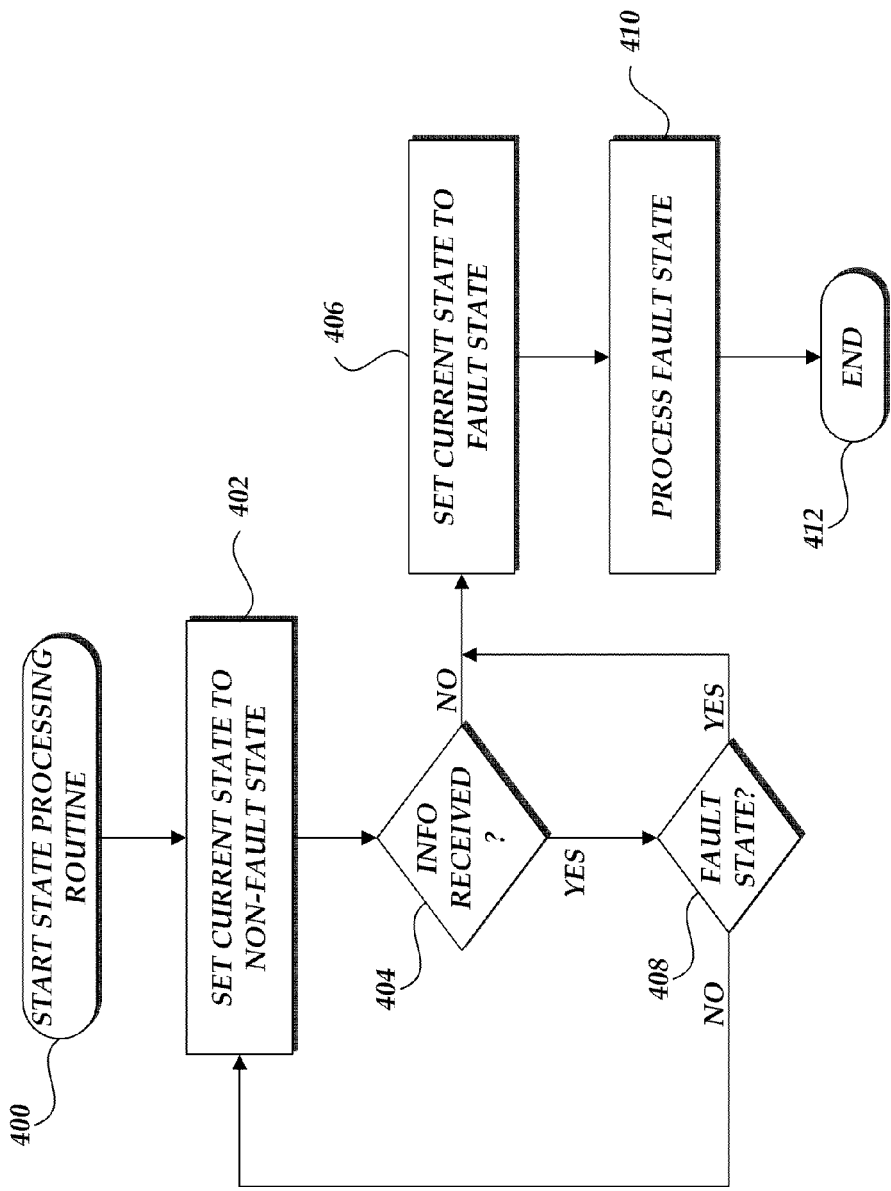
FIG. 4 is a flow diagram illustrative a control component operating state processing routine implemented by a state monitoring component.

Referring now to FIG. 4, a flow diagram illustrative a control component operating state processing routine 400 will be described. For purposes of illustration, routine 400 will be described as implemented by a state monitoring component 206. However, one skilled in the art will appreciate that routine 400 may be implemented, at least in part, by other components of the host computing device environment 100. In one aspect, the state monitoring component 206 can maintain a default state that corresponds to a non-fault state for the host computing device control component 106. If the state monitoring component 206 obtains information associated with the function of the host computing device control component 106, the state monitoring component 206 can determine whether to modify the default state based on the information obtained from the host computing device control component 106. Additionally, if the state monitoring component 206 does not receive any information, it can determine whether to modify the default condition. In an alternative embodiment, the state monitoring component can maintain a default state that corresponds to a fault state for the host computing device control component 106. In this embodiment, the state monitoring component 206 can determine whether to modify the default state to a non-fault state based on the information obtained from the host computing device control component 106 that no fault exists.

At block 402, the state monitoring component 206 sets the current state to a non-fault state. At decision block 404, the state monitoring component 206 determines whether it has received information regarding the operation of the host computing device environment 100 host computing device control component 106. Illustratively, the information regarding the operation of the host computing device control component 106 can include information regarding processor performance, operating system performance, network performance or power performance information. Illustratively, the information regarding the operation of the host computing device control component 106 can correspond to receipt of various operational parameters associated with the operation of a computing device, such as a host computing device. Additionally, the information regarding the operation of the host computing device control component 106 can include the processing of information in accordance with establish thresholds or performance parameters. For example, information associated with operation of processing resources may be compared with benchmarks or thresholds for processing resources. In another embodiment, the information regarding the operation of the host computing device control component 106 can correspond to a determination of whether one or more components or sub-components associated with the host computing device are operational or meeting determined operational parameters. In one embodiment, the host computing device control component 106 can be configured to transmit the information to the state monitoring component 206. In another embodiment, the state monitoring component 206 can poll the host computing device control component 106 to obtain the information.

If at decision block 404, the state monitoring component 206 determines that it has not received information regarding the operation of the host computing device control component 106, the state monitoring component 206 sets the current state to a fault condition at block 406. In this embodiment, the failure to receive information from the host computing device control component 106 can be interpreted as a fault condition. The routine 400 then proceeds to block 410, which will be described below.

Referring again to decision block 404, if the state monitoring component 206 has received information regarding the operation of the host computing device control component 106, the state monitoring component 206 processes the information to determine whether a fault condition exists at decision block 408. Illustratively, the processing of the information associated with the host computing device control component 106 can correspond to a comparison of one or more thresholds that establish the presence of fault conditions. If at decision block 408, the processing of the information regarding the host computing device control component 106 is indicative of no faults, the routine 400 returns to block 402.

If at decision block 408, the processing of the information regarding the host computing device control component 106 is indicative of a fault condition, the routine 400 proceeds to block 406 where the state monitoring component 206 sets the current state to a fault state. At block 410, the state monitoring component 206 processes the fault condition. Illustratively, the state monitoring component 206 can generate one or more visual indicators based on the determined fault condition. In one embodiment, the state monitoring component 206 can utilize a single visual indicator for any fault condition. In another embodiment, the state monitoring component 206 can utilize multiple visual indicators based on a type of fault condition. For example, the state monitoring component 206 can associate a first color indicator for a fault condition indicative of needed repair fault state and a second color indicator for a fault condition indicative of a troubleshooting fault state. In a further embodiment, the state monitoring component 206 can associate a separate indicator, such as a flashing indicator, that can be associated with a power off condition for the host computing device control component 106. One skilled in the relevant art will appreciate that additional or alternative visual indicators may be implemented. At block information corresponding to the operating state of the control component includes at least one of processor performance, operating system performance, network performance and power performance information 412, the routine 400 terminates.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing host computing devices, the host computing devices organized into a physical rack, the system comprising:
    a rack control component in communication with the host computing devices, the rack control component comprising one or more processors with executable instructions configured to implement one or more components, including:
    a management component for monitoring and controlling one or more aspects of the operation of the grouping of host computing devices;
    a state monitoring component comprising one or more processors with executable instructions configured for determining an operating state of the rack control component by evaluating performance information received from the management component, the state monitoring component having a power supply independent of a power supply associated with the rack control component, wherein the state monitoring component is included within the rack control component, and
    at least one visual indicator interface;
    wherein the state monitoring component causes the generation of a visual indication for displaying on the at least one visual indicator interface based on the determined operating state of the rack control component and utilizing the power supply independent of the power supply associated with the rack control component.

2. The system as recited in claim 1, wherein the state monitoring component causes generation of a specific color indicator, the specific color indicator corresponding to a determined non-fault state.

3. The system as recited in claim 1, wherein the state monitoring component causes generation of no indicator corresponding to a determined non-fault state.

4. The system as recited in claim 1, wherein the state monitoring component is further configured to:
    cause generation of a specific color indicator when no performance information is received by the state monitoring component from the management component within a period of time, the specific color indicator corresponding to a determined fault state.

5. The system as recited in claim 4, wherein the state monitoring component causes generation of a first color indicator, the first color indicator associated with a needed repair event.

6. The system as recited in claim 5, wherein the state monitoring component causes generation of a second color indicator, the second color indicator associated with a needed troubleshooting event.

7. The system as recited in claim 1, wherein the state monitoring component causes generation of a specific indicator, the specific indicator corresponding to a power off state for the rack control component.

8. The system as recited in claim 1, wherein the visual indication based on the determined operating state of the rack control component is based on processor performance, operating system performance, network performance or power performance.

9. The system as recited in claim 1 further comprising at least one visual indication device, the visual indication device in communication with the at least one visual indicator interface.

10. The system as recited in claim 1, wherein the at least one visual indication device includes at least one of a liquid crystal display, a light emitting diode, a set of light emitting diodes and a multi-colored light emitting diode.

11. A computer-implemented method for managing host computing devices, the host computing devices organized into a physical rack, the method comprising:
    under control of one or more processors, a state monitoring component configured with specific executable instructions and a power supply independent of a power supply associated with a control component, setting, by the state monitoring component, an initial state of the control component, the control component for monitoring and controlling one or more aspects of the operation of the host computing devices, wherein the state monitoring component is included within the control component;
    determining, by the state monitoring component, whether performance information corresponding to an operating state of the control component has been received from the control component;
    modifying, by the state monitoring component, a current state of the control component to one of a fault state or a non-fault state based on whether performance information corresponding to an operating state of the control component has been received from the control component; and causing, by the state monitoring component, the generation of a visual indicator based on the current state of the control component.

12. The computer-implemented method as recited in claim 11, wherein causing the generation of a visual indicator based on the current state of the control component includes causing generation of a specific color indicator corresponding to a determined non-fault state.

13. The computer-implemented method as recited in claim 11, wherein causing the generation of a visual indicator based on the current state of the control component includes causing generation of no indicator corresponding to a determined non-fault state.

14. The computer-implemented method as recited in claim 11, wherein causing the generation of a visual indicator based on the current state of the control component includes causing generation of a specific color indicator corresponding to a determined fault state.

15. The computer-implemented method as recited in claim 14, wherein causing the generation of a specific color indicator corresponding to a determined fault state includes causing generation of a first color indicator associated with a needed replacement event.

16. The computer-implemented method as recited in claim 15, wherein causing the generation of a specific color indicator corresponding to a determined fault state includes causing generation of a second color indicator associated with a needed troubleshooting event.

17. The computer-implemented method as recited in claim 11, wherein causing the generation of a visual indicator based on the current state of the control component includes causing generation of a specific indicator corresponding to a power off state for the rack control component.

18. The computer-implemented method as recited in claim 11, wherein the performance information corresponding to the operating state of the control component includes processor performance, operating system performance, network performance, component performance or power performance information.

19. The computer-implemented method as recited in claim 11, wherein setting an initial state of a control component includes setting the initial state to a non-fault state.

20. The computer-implemented method as recited in claim 11, wherein setting an initial state of a control component includes setting the initial state to a fault state.

21. A state monitoring component for monitoring a rack control component, the rack control component including one or more processors and a power supply, the rack control component configured to monitor and control one or more the operation of a grouping of host computing devices, the state monitoring component comprising:

a power supply independent of the power supply associated with the rack control component;

one or more processors for executing a state processing routine for determining an operating state of the rack control component by evaluating performance information received from the rack control component, and at least one visual indicator interface, wherein the state processing routine causes the generation of a visual indication based on the determined operating state of the rack control component, wherein the state processing routine is executed within the rack control component.

22. The system as recited in claim 21, wherein the state monitoring component causes generation of a specific color indicator, the specific color indicator corresponding to a determined non-fault state.

23. The system as recited in claim 21, wherein the state monitoring component causes generation of no indicator corresponding to a determined non-fault state.

24. The system as recited in claim 21, wherein the state monitoring component causes generation of a specific color indicator, the specific color indicator corresponding to a determined fault state.

25. The system as recited in claim 24, wherein the state monitoring component causes generation of a first color indicator, the first color indicator associated with a needed repair event.

26. The system as recited in claim 25, wherein the state monitoring component causes generation of a second color indicator, the second color indicator associated with a needed troubleshooting event.

27. The system as recited in claim 21, wherein the state monitoring component causes generation of a specific indicator, the specific indicator corresponding to a power off state for the rack control component.

28. The system as recited in claim 21, wherein the visual indication based on the determined operating state of the rack control component is based on at least one of processor performance, operating system performance, network performance and power performance.

29. The system as recited in claim 21 further comprising at least one visual indication device, the visual indication device in communication with the at least one visual indicator interface.

30. The system as recited in claim 29, wherein the at least one visual indication device includes at least one of a liquid crystal display, a light emitting diode, a set of light emitting diodes and a multi-colored light emitting diode.

* * * * *

UNITED STATES PATENT AND TRADEMARK OFFICE
CERTIFICATE OF CORRECTION

PATENT NO. : 9,547,575 B2  
APPLICATION NO. : 13/221609  
DATED : January 17, 2017  
INVENTOR(S) : Matthew T. Corddry et al.

Page 1 of 1

It is certified that error appears in the above-identified patent and that said Letters Patent is hereby corrected as shown below:

In the Claims

In Column 9 at Line 49, In Claim 21, after "more" insert --aspects of--.

In Column 10 at Line 13, (approx.), In Claim 22, change "system" to --state monitoring component--.

In Column 10 at Line 18, (approx.), In Claim 23, change "system" to --state monitoring component--.

In Column 10 at Line 21, (approx.), In Claim 24, change "system" to --state monitoring component--.

In Column 10 at Line 25, In Claim 25, change "system" to --state monitoring component--.

In Column 10 at Line 29, (approx.), In Claim 26, change "system" to --state monitoring component--.

In Column 10 at Line 33, (approx.), In Claim 27, change "system" to --state monitoring component--.

In Column 10 at Line 37, (approx.), In Claim 28, change "system" to --state monitoring component--.

In Column 10 at Line 42, (approx.), In Claim 29, change "system" to --state monitoring component--.

In Column 10 at Line 46, (approx.), In Claim 30, change "system" to --state monitoring component--.

Signed and Sealed this  
Ninth Day of May, 2017

Michelle K. Lee  
*Director of the United States Patent and Trademark Office*